US011144713B2

(12) United States Patent
Shinohara et al.

(10) Patent No.: US 11,144,713 B2
(45) Date of Patent: Oct. 12, 2021

(54) COMMUNICATION DEVICE GENERATING A RESPONSE MESSAGE SIMULATING A RESPONSE BY A TARGET USER

(71) Applicants: Kabushiki Kaisha Toshiba, Minato-ku (JP); Toshiba Digital Solutions Corporation, Kawasaki (JP)

(72) Inventors: Daisuke Shinohara, Fuchu (JP); Kazuhiko Abe, Meguro (JP); Hideki Ibi, Ota (JP); Megumi Kobayashi, Kodaira (JP); Satoko Kikuchi, Soka (JP); Tomoko Takeyama, Yokohama (JP); Masaya Hirabara, Kawasaki (JP); Tomoya Minatani, Fuchu (JP); Michinari Kino, Chofu (JP); Yuki Kawakami, Fuchu (JP); Yuji Tanaka, Kawasaki (JP)

(73) Assignees: Kabushiki Kaisha Toshiba, Minato-ku (JP); Toshiba Digital Solutions Corporation, Kawasaki (JP)

( * ) Notice: Subject to any disclaimer, the term of this patent is extended or adjusted under 35 U.S.C. 154(b) by 92 days.

(21) Appl. No.: 16/365,163

(22) Filed: Mar. 26, 2019

(65) Prior Publication Data
US 2019/0220505 A1 Jul. 18, 2019

Related U.S. Application Data

(63) Continuation of application No. PCT/JP2017/033701, filed on Sep. 19, 2017.

(30) Foreign Application Priority Data

Sep. 29, 2016 (JP) .............................. JP2016-191170

(51) Int. Cl.
G06F 40/166 (2020.01)
G06F 13/00 (2006.01)
(Continued)

(52) U.S. Cl.
CPC ............ *G06F 40/166* (2020.01); *G06F 13/00* (2013.01); *G06F 40/186* (2020.01);
(Continued)

(58) Field of Classification Search
CPC .............................. G06F 40/279; H04L 51/02
See application file for complete search history.

(56) References Cited

U.S. PATENT DOCUMENTS 6,980,149 B1 * 12/2005 Meyer ..................... H04L 67/38
340/4.4
7,386,595 B1 * 6/2008 Bloomer, Jr. ........ G06Q 10/107
709/203
(Continued)

FOREIGN PATENT DOCUMENTS

JP 2007-271655 10/2007
JP 2011-165046 8/2011
(Continued)

*Primary Examiner* — Shaun Roberts
(74) *Attorney, Agent, or Firm* — Oblon, McClelland, Maier & Neustadt, L.L.P.

(57) ABSTRACT

A communication device according to an embodiment includes an interpreter, a storage, and a generator. The interpreter is configured to interpret a content of a message addressed to a target user. The storage stores information on a personal feature of the target user. The generator is configured to generate a response message simulating a response by the target user on the basis of the content of the message addressed to the target user, which is interpreted by the interpreter, and the information on the personal feature of the target user stored in the storage.

11 Claims, 12 Drawing Sheets

(51) Int. Cl.
  *G06F 40/30* (2020.01)
  *G06F 40/186* (2020.01)
  *G06F 40/279* (2020.01)
  *H04L 12/58* (2006.01)

(52) U.S. Cl.
  CPC ............ *G06F 40/279* (2020.01); *G06F 40/30* (2020.01); *H04L 51/02* (2013.01)

(56) References Cited

U.S. PATENT DOCUMENTS

| | | | | |
|---|---|---|---|---|
| 7,831,676 | B1* | 11/2010 | Nagar | G06Q 10/107 |
| | | | | 709/206 |
| 8,954,317 | B1* | 2/2015 | Fisher | G06F 40/30 |
| | | | | 704/9 |
| 9,088,533 | B1* | 7/2015 | Zeng | G06N 3/084 |
| 9,361,722 | B2 | 6/2016 | Latorre-Martinez et al. | |
| 2006/0129927 | A1* | 6/2006 | Matsukawa | G06F 40/103 |
| | | | | 715/234 |
| 2007/0011367 | A1* | 1/2007 | Scott | G06Q 10/10 |
| | | | | 710/48 |
| 2009/0077185 | A1* | 3/2009 | Chiu | G06Q 10/107 |
| | | | | 709/206 |
| 2009/0248823 | A1* | 10/2009 | Li | H04L 51/14 |
| | | | | 709/206 |
| 2010/0169264 | A1* | 7/2010 | O'Sullivan | G06Q 10/10 |
| | | | | 706/52 |
| 2011/0298810 | A1* | 12/2011 | Fuyuno | G06T 13/40 |
| | | | | 345/474 |
| 2012/0191792 | A1* | 7/2012 | Chebiyyam | H04L 63/0245 |
| | | | | 709/206 |
| 2012/0245924 | A1* | 9/2012 | Brun | G06F 40/258 |
| | | | | 704/9 |
| 2013/0097270 | A1* | 4/2013 | Plotkin | H04M 1/7243 |
| | | | | 709/206 |
| 2013/0151257 | A1* | 6/2013 | MacMannis | G06F 40/103 |
| | | | | 704/270 |
| 2013/0185051 | A1* | 7/2013 | Buryak | G06F 40/58 |
| | | | | 704/2 |
| 2014/0019117 | A1* | 1/2014 | Ravi | G06F 40/274 |
| | | | | 704/9 |
| 2014/0210830 | A1 | 7/2014 | Latorre-Martinez et al. | |
| 2015/0052084 | A1 | 2/2015 | Kolluru et al. | |
| 2015/0113435 | A1* | 4/2015 | Phillips | G06F 40/20 |
| | | | | 715/752 |
| 2015/0200891 | A1* | 7/2015 | Richman | H04L 51/12 |
| | | | | 709/206 |
| 2015/0248651 | A1* | 9/2015 | Akutagawa | G06Q 50/01 |
| | | | | 705/7.19 |
| 2016/0050169 | A1* | 2/2016 | Ben Atar | G06F 3/04886 |
| | | | | 709/206 |
| 2016/0147731 | A1* | 5/2016 | Parikh | H04L 67/30 |
| | | | | 715/261 |
| 2017/0228363 | A1 | 8/2017 | Takahashi | |

FOREIGN PATENT DOCUMENTS

| | | |
|---|---|---|
| JP | 2014-146339 | 8/2014 |
| JP | 2014-186744 | 10/2014 |
| JP | 2015-184763 | 10/2015 |
| WO | WO 2016/084481 A1 | 6/2016 |

* cited by examiner

| CHARACTER STRING | WORD CLASS | TYPE OF CONJUGATION | URGENCY DEGREE | PSYCHOLOGICAL STATE |
|---|---|---|---|---|
| URGENCY | NOUN | — | HIGH | BAD |
| DO | VERB | CONJUGATION OF VERB "SURU" | MIDDLE | NORMAL |
| BE | AUXILIARY VERB | — | MIDDLE | NORMAL |
| REPORT | NOUN | — | MIDDLE | NORMAL |

FIG. 4

| CATEGORY | CONTENT | RESPONSE GENERATION RULE 1 | RESPONSE GENERATION RULE 2 |
|---|---|---|---|
| POLITENESS DEGREE | VERY POLITE | ALWAYS HONORIC WORD IS USED | - |
| POSITION 1 | (COMPANY) CHIEF | GENERATE FORMAL BUSINESS SENTENCE FOR DEPARTMENT MANAGER AND ABOVE | GENERATE SIMPLE SENTENCE FOR SECTION CHIEF AND BELOW |
| POSITION 2 | (CONFERENCE) STEERING COMMITTEE | GENERATE FORMAL BUSINESS SENTENCE | - |
| RESPONSE TIMING | EARLY / WAIT-AND-SEE MAILING LIST | IN CASE WHERE REPLY IS DELAYED BY XX HOURS OR MORE, AUTOMATICALLY REPLY TO IMPORTANT MAIL | WAIT-AND-SEE ALL CC'S MAILS |
| PERSONALITY | PATIENCE | DO NOT SAY NO EVEN WITH UNREASONABLE REQUEST | - |

FIG. 5

| TARGET | MAIL ADDRESS | POSITION | RECEPTION MAIL 1 | REPLY MAIL 1 | RECEPTION MAIL 2 | ... |
|---|---|---|---|---|---|---|
| DEAR MR. A | XXX@XXX.XX | CUSTOMER | DEAR MR. XX, PLEASE SEND ESTIMATE AS SOON AS POSSIBLE. | DEAR MR. A, THIS IS XX OF XX CO., LTD. I WILL SEND IT TODAY. | DEAR MR. XX, PLEASE DO RE-ESTIMATE. | |
| MR. B | YYY@YYY.YY | SUBORDINATE | XX CHIEF, PLEASE APPROVE PRESENT CASE. | MR. B, REPLY IMMEDIATELY AFTER CHECK. | – | |
| C DEPARTMENT MANAGER | ZZZ@ZZZ.ZZ | SUPERIOR | XX CHIEF, PLEASE REPORT CASE OF D COMPANY AS SOON AS POSSIBLE. | C DEPARTMENT MANAGER, THIS IS XX. PROBLEM WITH D COMPANY HAS BEEN RESOLVED. | PLEASE ARRANGE RESTAURANT FOR DRINKING PARTY. | |

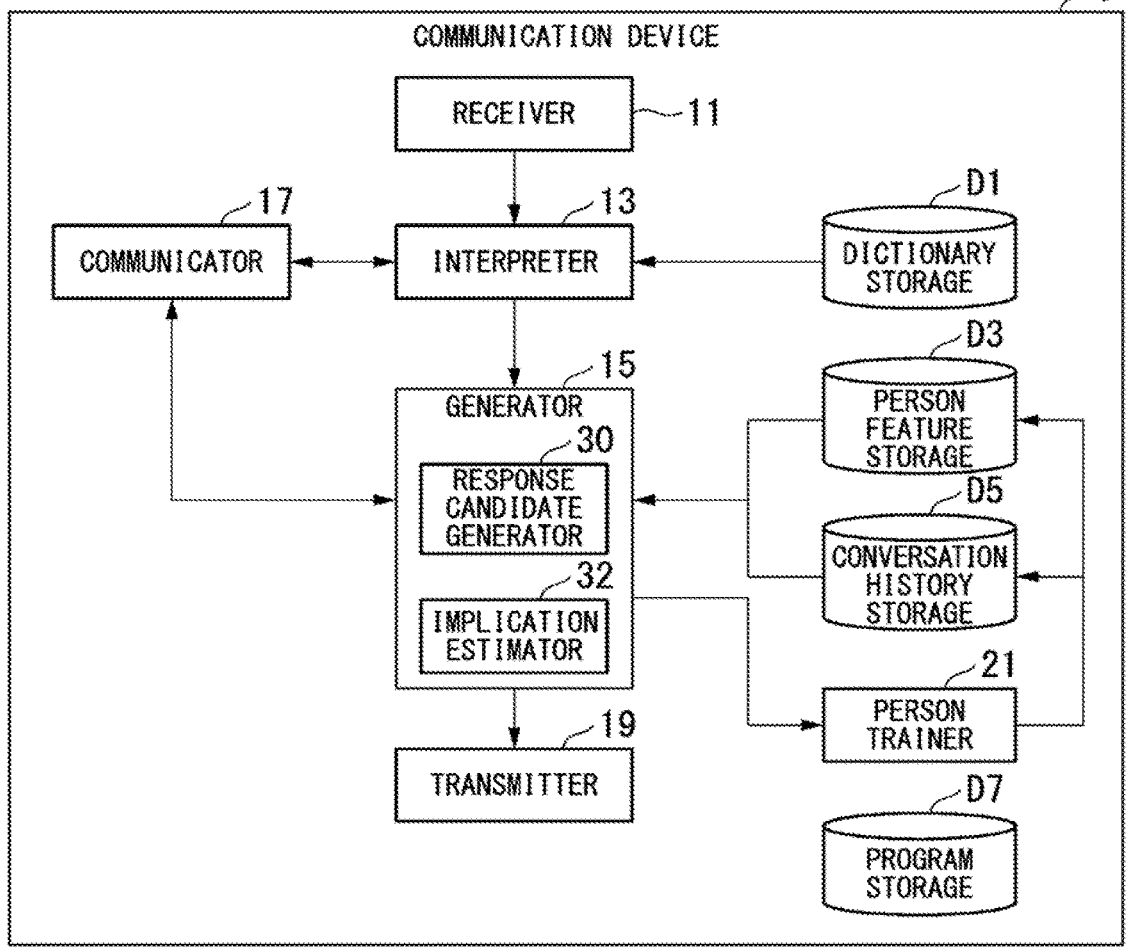

COMMUNICATION DEVICE GENERATING A RESPONSE MESSAGE SIMULATING A RESPONSE BY A TARGET USER

CROSS-REFERENCE TO RELATED APPLICATIONS

This application is based upon and claims the benefit of priority from Japanese Patent Application No. 2016-191170, filed on Sep. 29, 2016 and International Patent Application No. PCT/JP2017/033701, filed on Sep. 19, 2017; the entire contents of which are incorporated herein by reference.

FIELD

Embodiments described herein relate to a communication device, a communication method, and a storage medium.

BACKGROUND

For the purpose of reducing the load of e-mail generation, an e-mail generation method using a template has been proposed. In this method, generally, a large number of standard templates of which a use frequency is assumed to be high are prepared, the user selects a suitable template among the large number of templates, and thus the load of the e-mail generation is reduced. However, since the template to be used in the related art is not adjusted individually for each user, it is necessary for the user to select the template each time according to content to be transmitted and to rewrite the text of the template. In this method, it is necessary for the user to suitably rewrite the text of the template according to a transmission target.

BRIEF DESCRIPTION OF THE DRAWINGS

FIG. 4 is a diagram showing an example of personal feature data stored in a personal feature storage according to the first embodiment.

FIG. 5 is a diagram showing an example of conversation history data stored in a conversation history storage according to the first embodiment.

FIG. 12 is a functional block diagram showing an example of a communication device according to a third embodiment.

FIG. 13 is a diagram showing an example of a response message and a summary according to the third embodiment.

DETAILED DESCRIPTION

Some embodiments described herein provide a communication device, a communication method, and a storage medium capable of generating a response message simulating a response by a target user.

A communication device according to an embodiment includes an interpreter, a storage, and a generator. The interpreter is configured to interpret content of a message addressed to a target user. The storage stores information on a personal feature of the target user. The generator is configured to generate a response message simulating a response by the target user on the basis of the content of the message addressed to the target user, which is interpreted by the interpreter, and the information on the personal feature of the target user stored in the storage.

First Embodiment

Hereinafter, a communication device, a communication method, and a storage medium according to a first embodiment will be described with reference to the drawings.

The communication device 1 generates a response message simulating a response of a target user U on the basis of a personal feature of the target user U, a past conversation history, and the like with respect to a message received from a third party T, and transmits the response message to the third party T. The "target user" refers to a user who is a target of simulating a response in a case where the communication device 1 generates the response message. The message received from the third party T includes an e-mail, a text message in chat, a comment on a mini blog, or the like. Hereinafter, a configuration that processes the e-mail in the communication device 1 will be described as an example.

Figure 1:
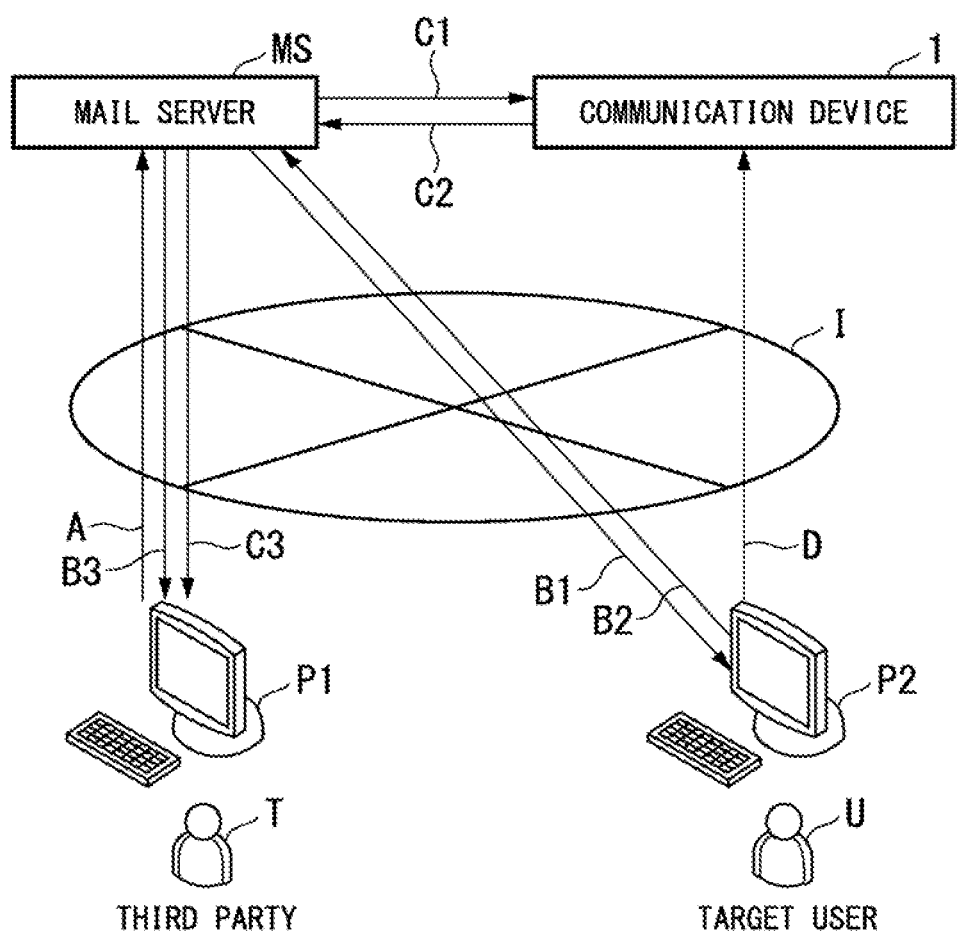
FIG. 1 is a diagram showing an example of a hardware constitution of a mail transmission and reception system using a communication device according to a first embodiment.

FIG. 1 is a diagram showing an example of a hardware constitution of a mail transmission and reception system using the communication device 1. In this mail transmission and reception system, a terminal (a first terminal P1) used by the third party T is connected to a mail server MS through the Internet I or the like. A terminal (a second terminal P2) used by the target user U is connected to the mail server MS and the communication device 1 through the Internet I or the like. The mail server MS is connected to the communication device 1 through the Internet I or the like. An application that realizes an interface capable of communicating with the communication device 1 and performing various adjustments for generating the response message may be installed in the second terminal P2.

In a case where the third party T transmits an e-mail to the target user U, the e-mail transmitted by the third party T on the basis of the operation of the first terminal P1 is generally received by the mail server MS (arrow A of FIG. 1). The mail server MS transmits the e-mail to the second terminal P2 (arrow B1 of FIG. 1). The target user U checking the e-mail operates the second terminal P2 to generate and transmit a reply mail (response message). Therefore, the response message transmitted from the second terminal P2 is received by the mail server MS (arrow B2 of FIG. 1), and the mail server MS transmits the response message to the first terminal P1 (arrow B3 of FIG. 1).

On the other hand, in the present embodiment, in a case where the third party T transmits an e-mail to the target user U, the e-mail transmitted from the first terminal P1 is received by the mail server MS (arrow A of FIG. 1), and the mail server MS transmits the e-mail to the communication device 1 (arrow C1 of FIG. 1). The communication device 1 that has received the e-mail generates and transmits the response message on the basis of a response instruction (arrow D of FIG. 1) from the target user U, a personal feature, a past conversation history, and the like. The response message transmitted from the communication device 1 is received by the mail server MS (arrow C2 of FIG. 1), and the mail server MS transmits the response message to the first terminal P1 (arrow C3 of FIG. 1).

Figures 2, 3:
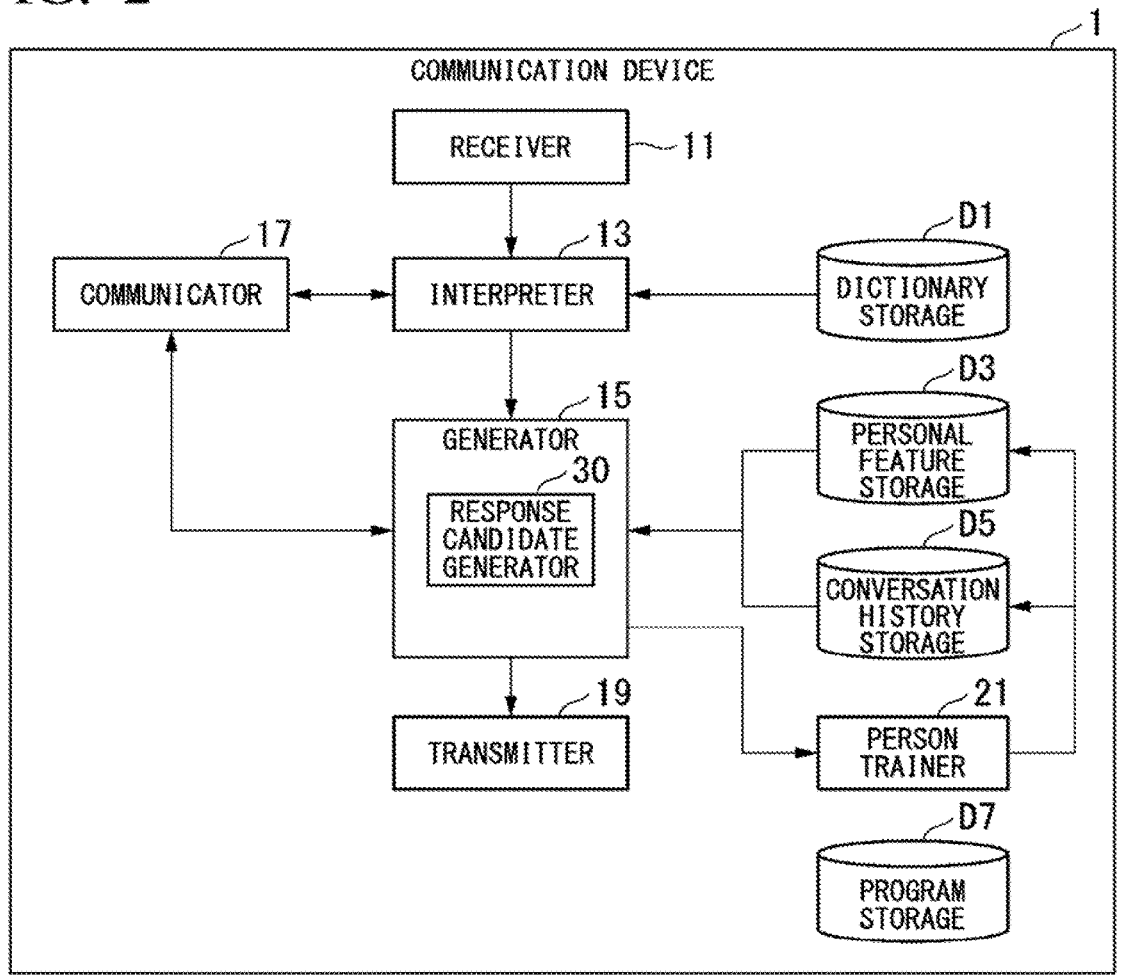
FIG. 2 is a functional block diagram showing an example of the communication device according to the first embodiment.
FIG. 3 is a diagram showing an example of dictionary data stored in a dictionary storage according to the first embodiment.

FIG. 2 is a functional block diagram showing an example of the communication device 1. For example, the communication device 1 includes a receiver 11, an interpreter 13, a generator 15, a communicator 17, a transmitter 19, a person trainer 21, a dictionary storage D1, a personal feature storage D3 (storage), a conversation history storage D5, and a program storage D7.

The receiver 11 receives the e-mail from the outside (for example, from the third party T, or the sender), and inputs the received e-mail into the interpreter 13.

The interpreter 13 interprets the content of the received e-mail. For example, the interpreter 13 acquires information (for example, an e-mail address) of the third party T, performs morphological analysis, syntax analysis, and semantic analysis of the text of the mail using dictionary data stored in the dictionary storage D1, and interprets the content of the received e-mail. In this case, the interpreter 13 may also interpret an urgency level of the e-mail, a psychological state of the sender of the mail, and the like. The interpreter 13 inputs an interpretation result of the e-mail into the generator 15.

The generator 15 generates a candidate for the response message to the received e-mail (hereinafter referred to as a "received mail") on the basis of a relationship between the third party T and the target user U. The generator 15 includes, for example, a response candidate generator 30. The response candidate generator 30 generates the candidate for the response message to the received mail on the basis of the response instruction of the target user U, the interpretation result input from the interpreter 13, the personal feature data stored in the personal feature storage D3, the conversation history data stored in the conversation history storage D5, and the like. Alternatively, the response candidate generator 30 may automatically generate the candidate for the response message on the basis of the interpretation result input from the interpreter 13, the personal feature data stored in the personal feature storage D3, the conversation history data stored in the conversation history storage D5, and the like without necessity of the response instruction of the target user U.

The communicator 17 transmits and receives various kinds of information between the interpreter 13 and the generator 15 and the second terminal P2, for example, through the Internet I.

The transmitter 19 transmits the response message generated by the response candidate generator 30 and decided by the target user U to the third party T.

The person trainer 21 trains the personal feature of the target user U on the basis of the information on the response message or the like generated by the response candidate generator 30 and decided by the target user U. The person trainer 21 stores the trained personal feature into the personal feature storage D3. The person trainer 21 stores the response message (and the received mail) into the conversation history storage D5.

The dictionary storage D1 stores, for example, dictionary data for interpreting the content of the received e-mail. FIG. 3 is a diagram showing an example of the dictionary data stored in the dictionary storage D1. For example, the dictionary storage D1 stores information for interpreting the content of the e-mail such as "character string," "word class," "type of conjugation." The dictionary storage D1 stores information such as "urgency degree" and "psychological state" as information for understanding the urgency degree of the received e-mail and the psychological state of the sender of the mail. For example, the dictionary storage D1 stores that the word class is "noun," the urgency degree is "high," and the psychological state is "bad" as information associated with the character string "urgency." In addition to the data shown in FIG. 3, the dictionary storage D1 may store a large number of pieces of dictionary data. The information on a dictionary associated with the urgency degree may be set for each target user U or may be trained by referring to a past e-mail. For example, a word included in a mail returned by the target user U within a certain period of time or a word included in a mail transmitted with an importance "high" may be registered in the dictionary as a word having an urgency degree "high." The dictionary may be expressed as a probability of a possibility that the mail is urgent in a case where a certain specific word or expression is included in the mail. This probability may be calculated from a mail received from the third party in the past.

The personal feature storage D3 stores, for example, the personal feature data of the target user U. The personal feature data includes various kinds of information such as a politeness degree, a position, personality, a language, and a usage frequency of Chinese characters at the time of generating the e-mail of the target user U. FIG. 4 is a diagram showing an example of the personal feature data stored in the personal feature storage D3. For example, the personal feature storage D3 stores information indicating that content is "very polite" and "always uses honorific words" as response generation rule 1, as information associated with a category "politeness degree" of the target user U. In addition to the data shown in FIG. 4, the personal feature storage D3 may store a large number of pieces of data related to the personal feature.

The conversation history storage D5 stores, for example, the past conversation history (an e-mail transmission and reception history) performed between the target user U and a plurality of third parties T. FIG. 5 is a diagram showing an example of the conversation history data stored in the conversation history storage D5. For example, the conversation history storage D5 stores that an e-mail address is "XXX@XXX.XX," a position is "customer," a received mail 1 is "Dear Mr. XX, please send an estimate as soon as possible." a reply mail 1 is "Dear Mr. A, it is XX of XX Co., Ltd. The estimate will be sent today." and a received mail 2 is "Dear Mr. XX, please do a re-estimate." as information associated with "Dear Mr. A." who is the third part T. In addition to the data shown in FIG. 5, the conversation history storage D5 may store a large number of pieces of the conversation history data. The third party T may be defined as a group of persons having a position such as "all colleagues" or "executives" or personal attributes.

The program storage D7 stores, for example, a program for realizing some or all of the functional units of the communication device 1.

Each of the dictionary storage D1, the personal feature storage D3, the conversation history storage D5, and the program storage D7 is realized by a read only memory (ROM), a random access memory (RAM), a hard disk drive (HDD), a flash memory, or the like. The dictionary storage D1, the personal feature storage D3, the conversation history storage D5, and the program storage D7 may be implemented by one piece of hardware. Each of the dictionary storage D1, the personal feature storage D3, the conversation history storage D5, and the program storage D7 may be provided outside the communication device 1.

Some or all of the functional units of the communication device 1 described above may be realized by the processor executing the program (software) stored in the program storage D7. The program may be preliminarily installed at the time of starting an operation of the communication device 1, may be downloaded from another computer, or may be installed from a portable storage medium such as a compact disc. Some or all of the functional units of the communication device 1 may be realized by hardware such as large scale integration (LSI), an application specific integrated circuit (ASIC), or a field-programmable gate array (ASIC), or may be realized by a combination of software and hardware.

Figure 6:
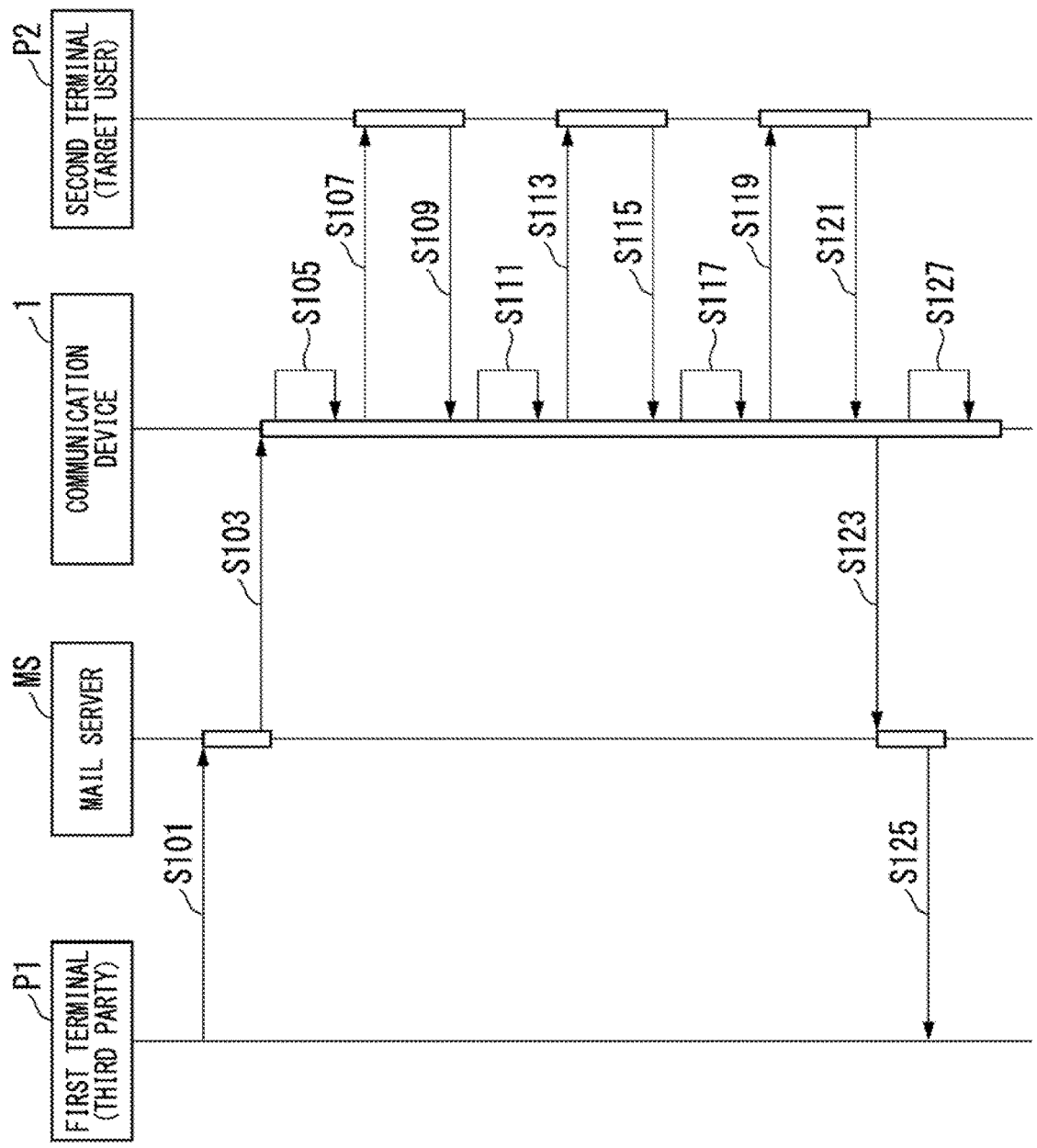
FIG. 6 is a sequence diagram showing an example of a process of the communication device according to the first embodiment.

Next, the operation of the communication device 1 according to the first embodiment will be described. FIG. 6 is a sequence diagram showing an example of a process of the communication device 1.

First, the first terminal P1 transmits the e-mail addressed to the target user U on the basis of operation of the third party T (step S101).

Next, the mail server MS transmits the e-mail received from the first terminal P1 to the communication device 1 (step S103).

Next, the receiver 11 of the communication device 1 receives the e-mail received from the mail server MS, and inputs the received e-mail into the interpreter 13. The interpreter 13 interprets the content of the received mail and inputs the interpretation result into the response candidate generator 30 (step S105). For example, the interpreter 13 acquires the information (for example, the e-mail address) of the third party T, and performs the morphological analysis, the syntax analysis, the semantic analysis, and the like of the text of the mail by referring to the dictionary storage D1 to interpret the content of the received e-mail. In this case, the interpreter 13 may also interpret the urgency level of the e-mail, the psychological state of the sender of the mail, and the like.

Next, the interpreter 13 transmits the received mail (and the interpretation result) to the second terminal P2 through the communicator 17 (step S107). The target user U inputs the response instruction using an interface displayed on a display (not shown) of the second terminal P2. At this time, the response instruction input by the target user U may be a simple instruction such as "YES." The second terminal P2 transmits the response instruction of the target user U to the communication device 1 (step S109).

Next, the response candidate generator 30 generates the candidate for the response message with respect to the received mail on the basis of the relationship between the third party T and the target user U, the interpretation result input from the interpreter 13, and the response instruction of the target user U received from the second terminal P2 (step S111). For example, in a case where the response instruction of the target user U indicating "YES" is received, the response candidate generator 30 generates a response message on the basis of the content "YES." At this time, the response candidate generator 30 generates the response message simulating the response of the target user U (the response message simulating the politeness degree, the language, the usage of Chinese characters, and the like) on the basis of the personal feature data stored in the personal feature storage D3. The response candidate generator 30 generates the response message according to the third party T on the basis of the relationship between the third party T and the target user U, with reference to the conversation history data and the like stored in the conversation history storage D5.

Alternatively, the response candidate generator 30 may automatically generate the candidate for the response message on the basis of the interpretation result input from the interpreter 13, the personal feature data stored in the personal feature storage D3, the conversation history data stored in the conversation history storage D5, and the like without necessity of the response instruction from the target user U. For example, in a case where the input interpretation result indicates that the third party T is "Dear Mr. A" and the text of the mail includes elements of "urgency" and "estimate," the response candidate generator 30 obtains a reply interpretation "sending today" on the basis of the conversation history and the like stored in the conversation history storage D5 as shown in FIG. 5. In a case where the input interpretation result indicates that the third party T is "Mr. B" and the text of the mail includes elements of "the present case" and "approval," the response candidate generator 30 obtains a reply interpretation "reply immediately after checking" on the basis of the conversation history and the like stored in the conversation history storage D5. The response candidate generator 30 automatically generates the candidate for the response message on the basis of this reply interpretation.

The response candidate generator 30 may generate a plurality of candidates for the response message. The response candidate generator 30 may generate the candidate for the response using a statistical translation technique. The response candidate generator 30 may generate the candidate for the response message by estimating an emotion of the mail sender from the conversation history of the target user U stored in the conversation history storage D5. The response candidate generator 30 may generate the candidate for the response message using not only the conversation history of the target user U stored in the conversation history storage D5 but also generally use general-purpose data related to an e-mail. The response candidate generator 30 may generate the candidate for the response message in consideration of a schedule of the target user U or the like. The response candidate generator 30 may generate the candidate for the response message candidate using a neural network.

Next, the response candidate generator 30 transmits the generated candidate for the response message to the second terminal P2 through the communicator 17 (step S113). The target user U checks the candidate for the response message by using the interface displayed on the display (not shown) of the second terminal P2 and adjusts the candidate for the response message. For example, the target user U performs an adjustment instruction to change the text of the response message (step S115). Next, the response candidate generator 30 adjusts the candidate for the response message on the basis of the adjustment instruction of the target user U received from the second terminal P2 (step S117), and transmits the adjusted candidate for the response message again to the second terminal P2 through the communicator 17 (step S119).

Figure 7:
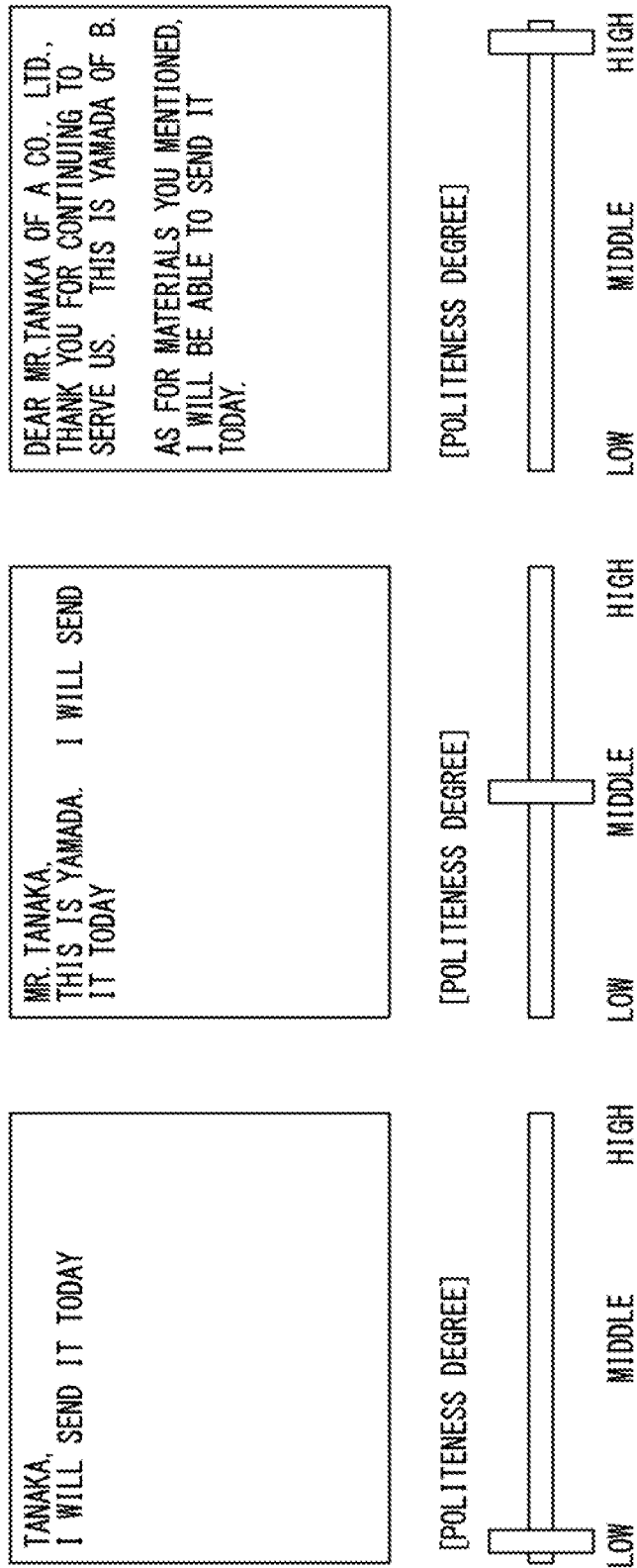
FIG. 7 is a diagram showing an example of a response message in a case where a "politeness degree" is adjusted according to the first embodiment.

Alternatively, the target user U is able to indicate his or her own emotion with respect to the response message by using an emotion setting function (for example, an emotion setting scroll bar) mounted on the interface of the second terminal P2. The response candidate generator 30 dynamically adjusts the candidate for the response message on the basis of the instruction to set the emotion of the target user U. FIG. 7 is a diagram showing an example of the candidate for the response message in a case where the "politeness degree" is adjusted using the emotion setting scroll bar. The target user U is able to adjust the politeness degree of the candidate for the response message by operating the emotion setting scroll bar indicating the politeness degree. For example, the response message that was set as "Tanaka, I will send it today." in a state in which the politeness is "low" is changed to "Mr. Tanaka, this is Yamada. I will send it today." in a state in which the politeness is "middle," and more polite expressions are used in the text. In a state in which the politeness is "high," the response message is changed to "Dear Mr. Tanaka of A Co., Ltd., Thank you for continuing to serve us. This is Yamada of B. As for the materials you mentioned, 1 will be able to send it today." and even more polite expressions are used in the text.

Figure 8:
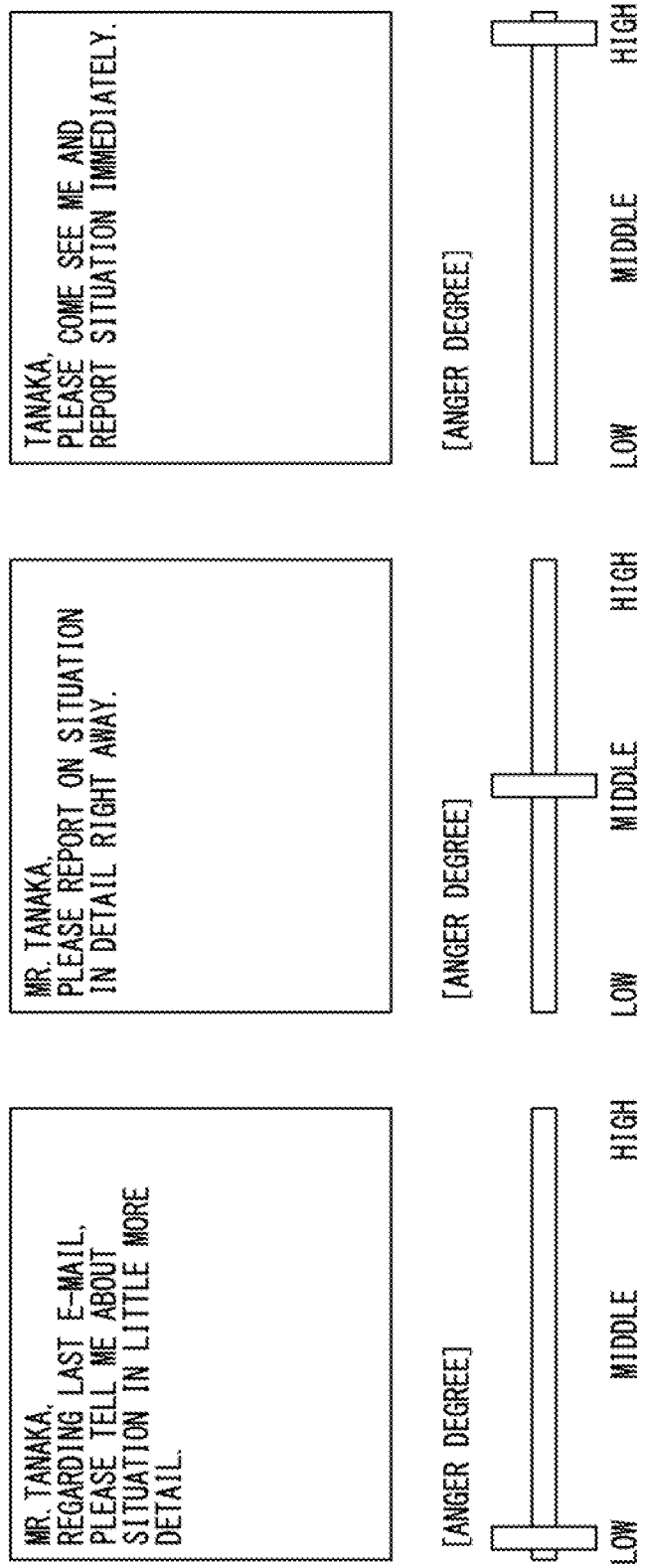
FIG. 8 is a diagram showing an example of a response message in a case where an "anger degree" is adjusted according to the first embodiment.

FIG. 8 is a diagram showing an example of the candidate for the response message in a case where an "anger degree" is adjusted through the emotion setting scroll bar. For example, the user U is able to dynamically adjust the anger degree of the candidate for the response message by operating the emotion setting scroll bar indicating the anger degree. For example, in a state in which the anger degree is "low," the response message that was set as "Mr. Tanaka, Regarding the last e-mail, please tell me about the situation in a little more detail," is changed to "Mr. Tanaka, please report on the situation in detail right away," in a state in which the anger degree is "middle", and the response message is changed such that expressions reflecting the anger degree are used in the text. In a state in which the anger degree is "high," it is changed to "Tanaka, please come see me and report on the situation immediately." and the response message is changed such that expressions reflecting a higher anger degree are used in the text.

The response candidate generator 30 does not need to generate one response message for the same politeness degree or anger degree but may include a fluctuation function to change display every time.

The interface of the second terminal P2 may include a function of receiving a voice instruction of the target user U. This interface may include a function of estimating the emotion of the target user U from an image, sound (intonation, voice, speech speed, volume), and the like of the target user U. In a case where the image of the target user U is used, tagging may be performed on the image of the target, which is prepared in advance, and a change in a feature point may be analyzed to determine happiness and anger of the target user U. In a case where the voice of the target user U is used, tagging is performed on a large amount of voice data prepared in advance, and happiness and anger may be determined on the basis of presence or absence of a characteristic event.

In a case where the instruction by the voice of the target user U is in an angry tone, the interface of the second terminal P2 may input an instruction to automatically increase "anger degree" into the response candidate generator 30. In this case, the response candidate generator 30 may change the response message on the basis of the relationship between the third party T and the target user U. For example, in a case where the third party T is a "colleague," the response candidate generator 30 may increases the "anger degree," and in a case where the third party T is a "customer," the response candidate generator 30 may generate a response message that does not express an emotion while maintaining a high politeness degree.

Next, in a case where the target user U determines that the adjustment of the response message is completed, the second terminal P2 inputs a response decision instruction into the response candidate generator 30 (step S121). For example, the target user U may decide the response message when the user presses a "decision" button displayed on the display of the second terminal P2.

The response candidate generator 30 that has received the response decision instruction from the second terminal P2 inputs the decided response message into the transmitter 19. The transmitter 19 inputs the decided response message into the mail server MS (step S123), and the mail server MS transmits the response message to the first terminal P1 (step S125).

Next, the response candidate generator 30 inputs the decided response message into the person trainer 21. The person trainer 21 trains a personality of the target user U on the basis of the response message input from the response candidate generator 30 (step S127). For example, the "politeness degree" of the target user U stored in the personal feature storage D3 is updated using the response message adjusted on the basis of the instruction of the target user U. The person trainer 21 stores the response message input from the response candidate generator 30 in the conversation history storage D5. The person trainer 21 may store sensing information such as the image and the voice acquired from the target user U in the conversation history storage D5. Therefore, the process of the present sequence diagram is ended.

In a case where the target user U sets a weighting flag for emphasizing a specific response message as a training target, the person trainer 21 may store the weighting flag in the conversation history storage D5 in addition to the response message. The person trainer 21 may store a pair of the candidate for the response message generated initially by the response candidate generator 30 and the response message after adjustment by the target user U in the conversation history storage D5.

According to the above-described first embodiment, it is possible to generate the response message simulating the response by the target user U. Since this response message reflects the personal feature of the target user U, the third party T who has received the response message can recognize that the message is a message transmitted by the target user U himself or herself.

Second Embodiment

Hereinafter, a second embodiment will be described. A communication device 2 according to the second embodiment is different from the first embodiment in that the communication device 2 is mounted on the second terminal P2 used by the target user U. Therefore, with respect to the constitution and the like, the figures described in the first embodiment and the related description are cited, and a detailed description thereof will be omitted.

Figure 9:
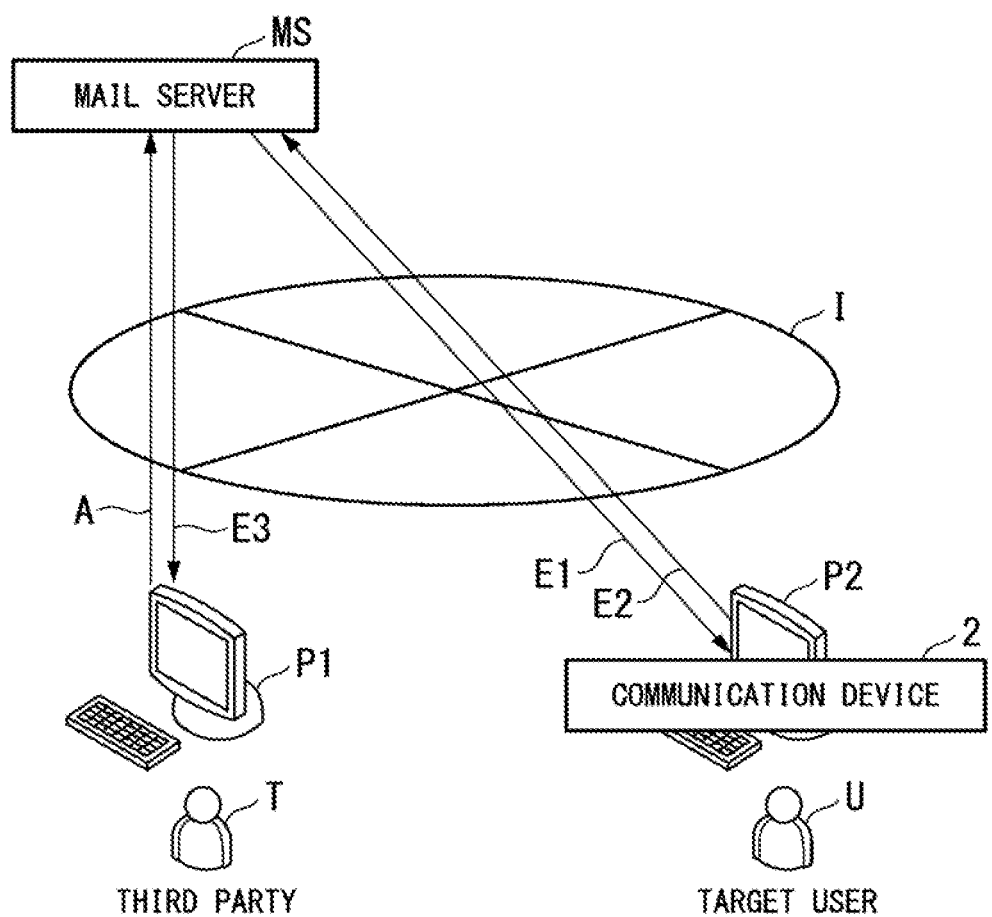
FIG. 9 is a diagram showing an example of a hardware constitution of a mail transmission and reception system using a communication device according to a second embodiment.

FIG. 9 is a diagram showing an example of a hardware constitution of a mail transmission and reception system using the communication device 2 according to the second embodiment. In this mail transmission and reception system, a terminal (the first terminal P1) used by the third party T is connected to the mail server MS through the Internet 1 or the like. A terminal (the second terminal P2) used by the target user U is connected to the mail server MS through the Internet 1 or the like. The communication device 2 is mounted on the second terminal P2.

In the present embodiment, in a case where the third party T transmits an e-mail to the target user U, the e-mail transmitted from the first terminal P1 is received by the mail server MS (arrow A of FIG. 9), the mail server MS transmits the e-mail to the communication device 2 mounted on the second terminal P2 (arrow E1 of FIG. 9). The communication device 2 that has received the e-mail generates and transmits the response message on the basis of the response instruction from the target user U, the personal feature, the past conversation history, and the like. The response message transmitted from the communication device 2 is received by the mail server MS (arrow E2 of FIG. 9), and the mail server MS transmits the response message to the first terminal P1 (arrow E3 of FIG. 9).

Figure 10:
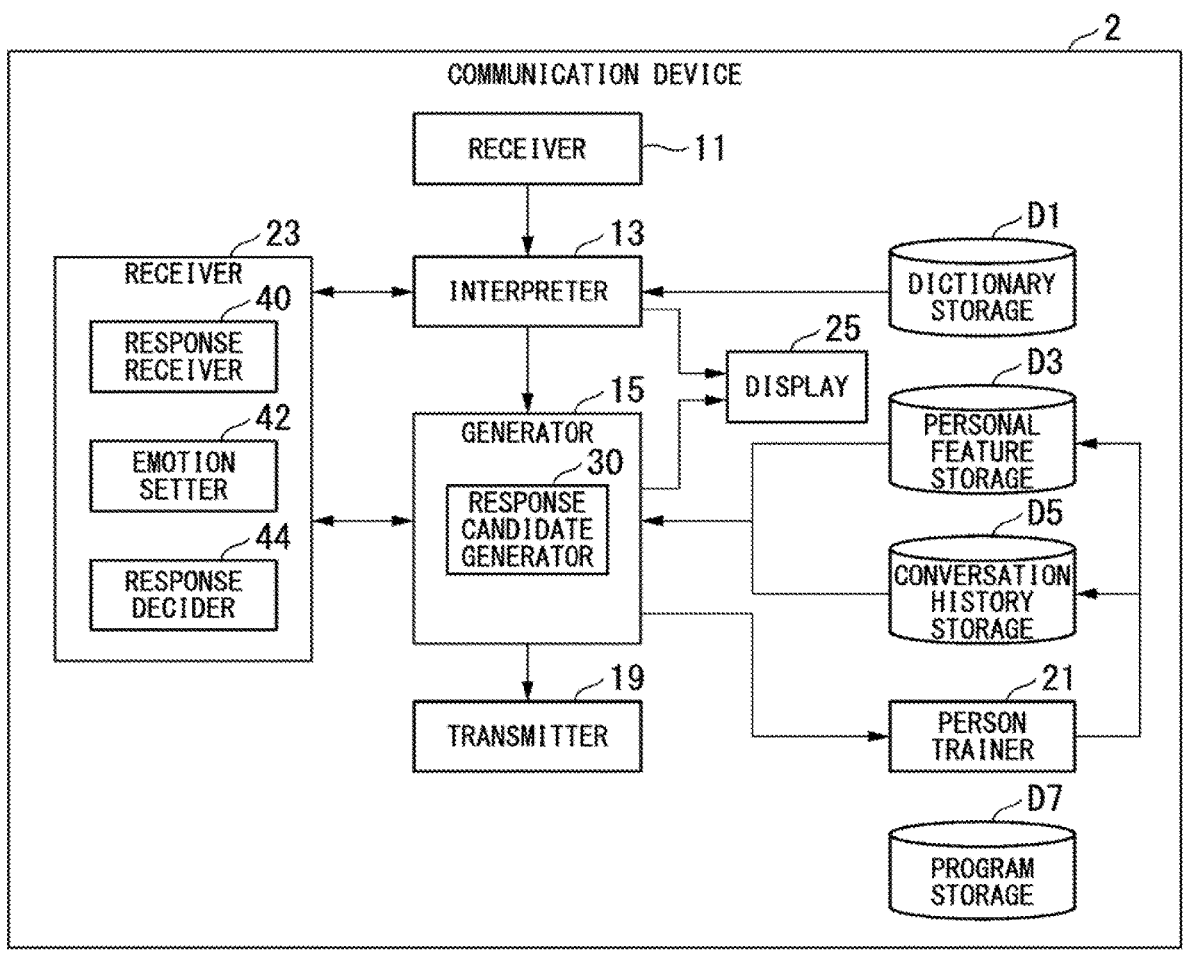
FIG. 10 is a functional block diagram showing an example of the communication device according to the second embodiment.

FIG. 10 is a functional block diagram showing an example of the communication device 2. The communication device 2 includes a receiver 23 instead of the communicator 17 of the communication device 1 according to the first embodiment. The communication device 2 further includes a display 25.

The receiver 23 receives an operation (change instruction) by the target user U of the communication device 2. The receiver 23 includes, for example, a response receiver 40, an emotion setter 42, and a response decider 44. For example, each of the response receiver 40, the emotion setter 42, and the response decider 44 is an input terminal such as a mouse, a keyboard, a touch panel, or the like.

The response receiver 40 receives the response instruction of the target user U to the received mail. For example, the target user U is able to instruct the response content to the received mail by operating the response receiver 40. In response to the response instruction by the target user U, the response candidate generator 30 generates and adjusts the candidate for the response message.

The emotion setter 42 receives an instruction to set the emotion of the target user U with respect to the response message. For example, the target user U is able to instruct the emotion (the politeness degree, the anger degree, and the like) of the target user U with respect to the response message by operating the emotion setter 42. The response candidate generator 30 adjusts the candidate for the response message according to emotion setting instruction input by the target user U.

The response decider 44 receives the response decision instruction of the target user U with respect to the response message. For example, the target user U is able to decide the response message generated by the response candidate generator 30 by operating the response decider 44.

The display 25 displays the response message or the like generated by the response candidate generator 30. For example, the display 25 includes a liquid crystal display or the like. In a case where the display 25 is a display corresponding to a touch panel, the display 25 may include the function of the receiver 23 described above.

Figure 11:
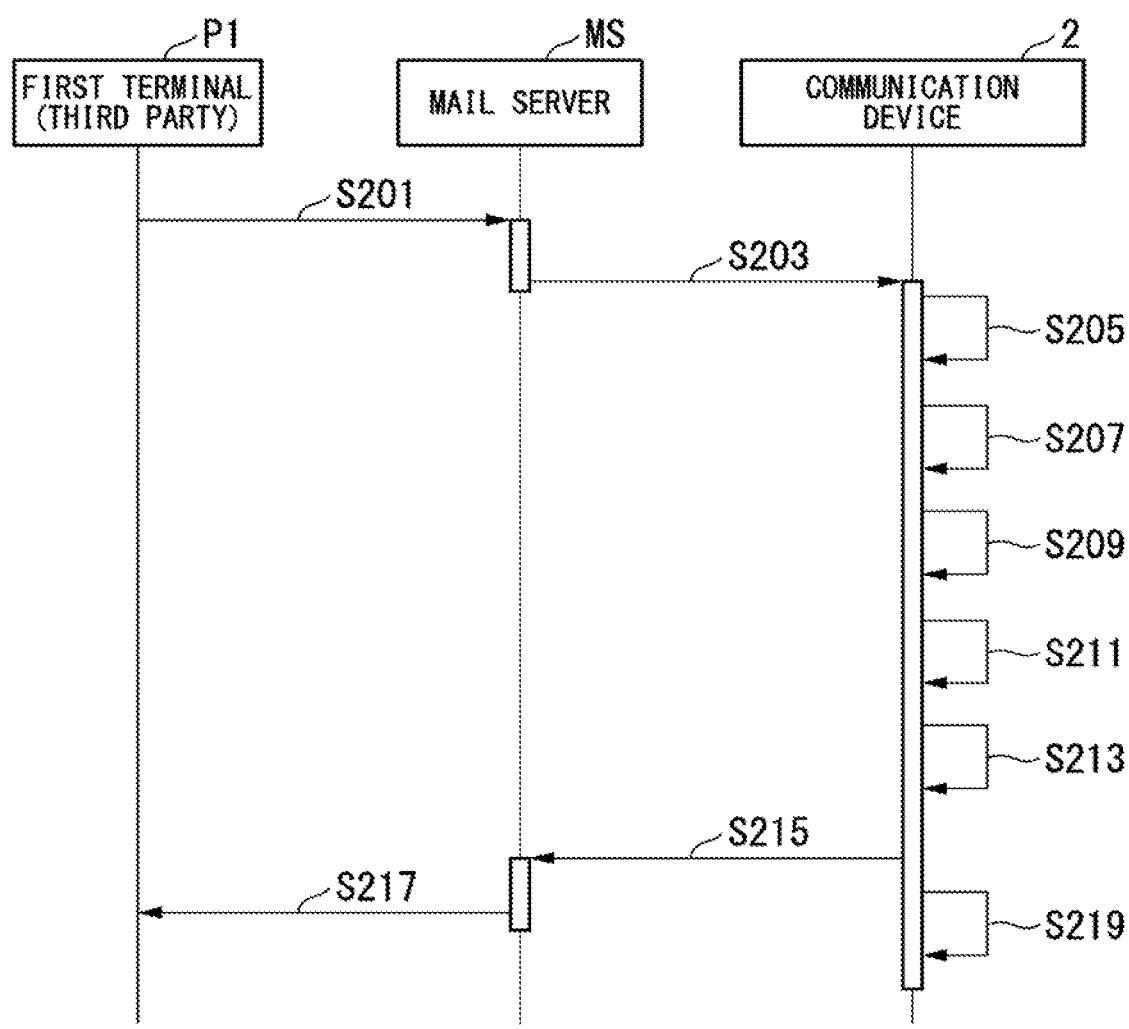
FIG. 11 is a sequence diagram showing an example of a process of the communication device according to the second embodiment.

Next, the operation of the communication device 2 of the second embodiment will be described. FIG. 11 is a sequence diagram showing an example of a process of the communication device 2.

First, the first terminal P1 transmits the e-mail addressed to the target user U on the basis of the instruction of the third party T (step S201).

Next, the mail server MS transmits the e-mail received from the first terminal P1 to the communication device 2 mounted on the second terminal P2 (step S203).

Next, the receiver 11 of the communication device 2 receives the e-mail received from the mail server MS, and inputs the received e-mail into the interpreter 13. The interpreter 13 interprets the content of the received mail and inputs the interpretation result into the response candidate generator 30 (step S205).

Next, the interpreter 13 displays the received mail (and the interpretation result) on the display 25 (step S207). The target user U checks the received mail displayed on the display 25 and inputs the response instruction through the response receiver 40.

Next, the response candidate generator 30 generates the candidate for the response message with respect to the received mail on the basis of the relationship between the third party T and the target user U, the interpretation result input from the interpreter 13, and the response instruction of the target user U input through the response receiver 40, and displays the candidate for the response message with respect to the received mail on the display 25 (step S209). Alternatively, the response candidate generator 30 may automatically generate the candidate for the response message, on the basis of the interpretation result input from the interpreter 13, the personal feature data stored in the personal feature storage D3, the conversation history data stored in the conversation history storage D5, and the like without necessity of the response instruction from the target user U.

The target user U checks the candidate for the response message displayed on the display 25 and adjusts the candidate for the response message. For example, in a case where the target user U performs an adjustment instruction for changing the sentence of the response message through the response receiver 40, the response receiver 40 inputs the adjustment instruction into the response candidate generator 30. Next, the response candidate generator 30 adjusts the candidate for the response message on the basis of the adjustment instruction of the target user U and displays the adjusted candidate for the response message on the display 25 (step S211).

Alternatively, the target user U may instruct the own emotion with respect to the response message, by using the emotion setter 42 (for example, an emotion setting scroll bar). The response candidate generator 30 dynamically adjusts the candidate for the response message on the basis of the emotion setting instruction of the target user U.

Next, in a case where the target user U determines that the adjustment of the response message is completed, the target user U decides the response message through the response decider 44. For example, in a case where the target user U performs a decision instruction of the response message through the response decider 44, the response decider 44 inputs the decision instruction into the response candidate generator 30 (step S213).

The response candidate generator 30 inputs the decided response message into the transmitter 19. The transmitter 19 inputs the decided response message into the mail server MS (step S215), and the mail server MS transmits the response message to the first terminal P1 (step S217).

Next, the response candidate generator 30 inputs the decided response message into the person trainer 21. The person trainer 21 trains the personality of the target user U on the basis of the response message input from the response candidate generator 30 (step S219). Therefore, the process of the present sequence diagram is ended.

According to the above-described second embodiment, it is possible to generate the response message simulating the response by the target user U by using the communication device 2 mounted on the second terminal P2 used by the target user U. Since this response message reflects the personal feature of the target user U, the third party T who has received the response message can recognize that the message is a message transmitted by the target user U himself or herself.

Third Embodiment

Hereinafter, a third embodiment will be described. A communication device 3 according to the third embodiment is different from the first embodiment in that the generator 15 further includes an implication estimator 32. Therefore, with respect to the constitution and the like, the figures described in the first embodiment and the related description are cited, and a detailed description thereof will be omitted.

FIG. 12 is a functional block diagram showing an example of the communication device 3 according to the third embodiment. As compared with the communication device 1 according to the first embodiment, the generator 15 of the communication device 3 according to the third embodiment further includes the implication estimator 32.

The implication estimator 32 generates a summary briefly expressing an implication (a real intention or an emotion) of the target user U related to the response message generated by the response candidate generator 30. For example, the implication estimator 32 generates the summary on the basis of the interpretation result input from the interpreter 13, the response instruction of the target user U received from the second terminal P2, the personal feature data stored in the personal feature storage D3, the conversation history data stored in the conversation history storage D5, and the like.

FIG. 13 is a diagram showing an example of the response message and the summary. With respect to the response message generated by the response candidate generator 30 "Dear Mr. Tanaka of A Co., Ltd, thank you for continuing to serve us. This is Yamada of B. As for the materials you mentioned, I will be able to send it today. Tomorrow morning, can you check please?", the implication estimator generates the summary "I will send it today. (probably you can check it tomorrow morning.)". The transmitter 19 may attach the summary to the response message and transmit the response message to the third party T. When the target user U checks the candidate for the response message, a check work by the target user U may be simplified by displaying the summary together.

The processes other than the implication estimator 32 (processes in the interpreter 13, the generator 15, and the like) are similar to the processes in the above-described first embodiment, and thus a detailed description thereof will be omitted.

According to the above-described third embodiment, it is possible to generate the response message simulating the response by the target user U. Since this response message reflects the personal feature of the target user U, the third party T who has received the response message can recognize that the message is a message transmitted by the target user U himself or herself. It is also possible to generate the summary briefly expressing the real intention or the emotion of the target user U related to the response message generated by the response candidate generator 30.

In the above description, the example in which the implication estimator 32 is added to the communication device 1 according to the first embodiment has been described. However, the above-described implication estimator 32 is also able to be added to the communication device 2 according to the second embodiment.

Fourth Embodiment

Hereinafter, a fourth embodiment will be described. A communication device 4 according to the fourth embodiment is different from the first embodiment in that the communication device 4 according to the fourth embodiment performs a response process on voice data (for example, telephone voice data) of the third party T. Therefore, with respect to the constitution and the like, the figures described in the first embodiment and the related description are cited, and a detailed description thereof will be omitted.

Figure 14:
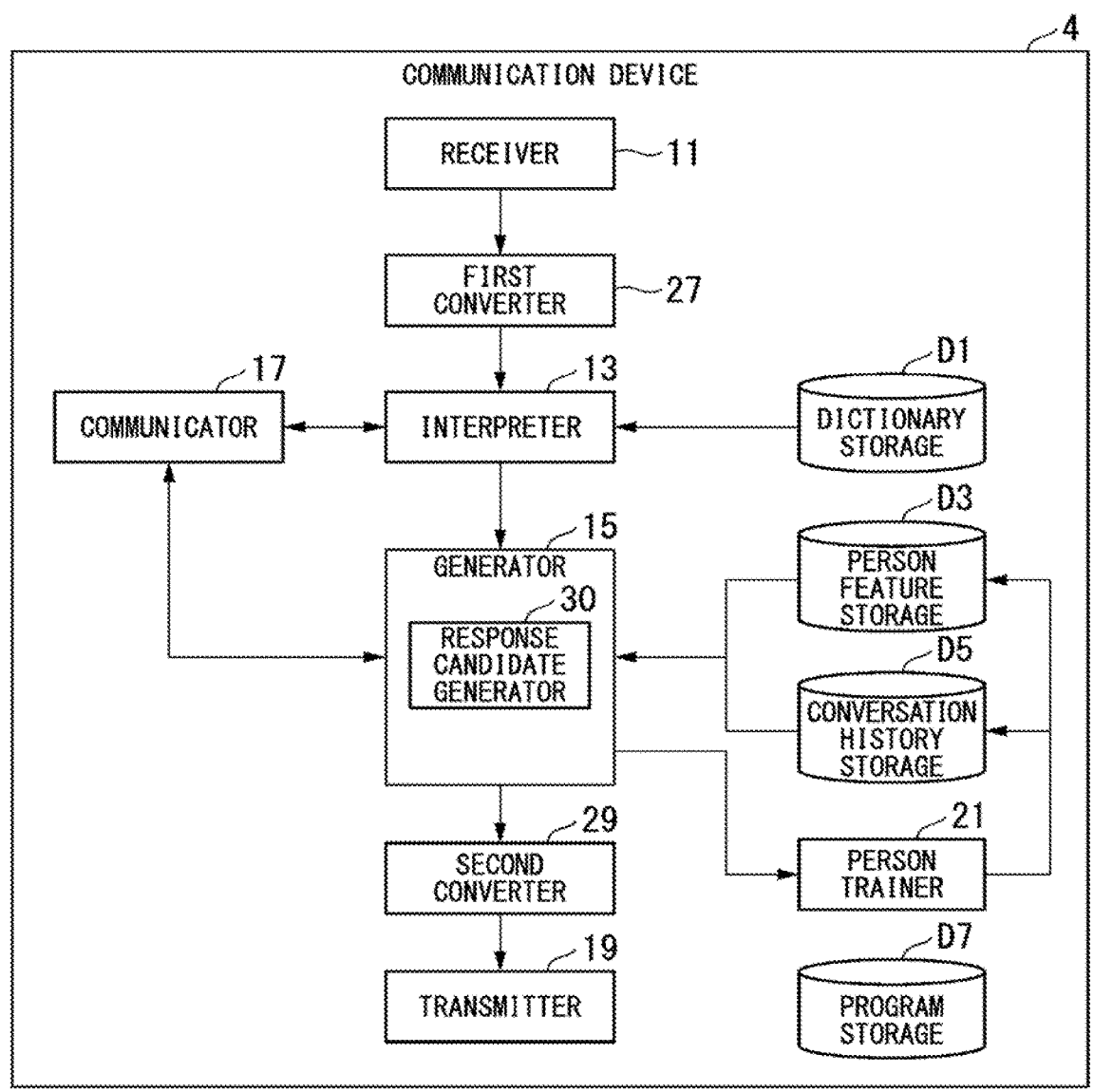
FIG. 14 is a functional block diagram showing an example of a communication device according to a fourth embodiment.

FIG. 14 is a functional block diagram showing an example of the communication device 4 according to the fourth embodiment. In addition to the constitution of the communication device 1 according to the first embodiment, the communication device 4 includes a first converter 27 and a second converter 29.

The first converter 27 converts the voice data input from the receiver 11 into text data. The first converter 27 inputs the converted text data into the interpreter 13.

The second converter 29 converts the text data that is the response message generated by the response candidate generator 30 into voice data. The second converter 29 inputs the converted voice data into the transmitter 19. The transmitter 19 inputs the voice data input from the second converter 29 into the third party T.

The processes other than the first converter 27 and the second converter 29 (processes in the interpreter 13, the generator 15, and the like) are similar to the processes in the above-described first embodiment, and thus a detailed description thereof will be omitted.

According to the above-described fourth embodiment, it is possible to process the voice data of the third party T and generate the voice data of the response message simulating the response by the target user U.

The communication device 4 may transmit the text data that is the response message generated by the response candidate generator 30 to the third party T as the e-mail.

In the above description, the example in which the first converter 27 and the second converter 29 are added to the communication device 1 according to the first embodiment has been described. However, the first converter 27 and the second converter 29 described above are also able to be added to the communication device 2 according to the second embodiment or the communication device 3 according to the third embodiment.

According to at least one embodiment described above, since there is provided the interpreter that interprets the content of the message addressed to the target user, the storage that stores information on the personal feature of the target user, and the generator that generates the response message simulating the response by the target user on the basis of the content of the message addressed to the target user, which is interpreted by the interpreter, and the information on the personal feature stored in the storage, it is possible to generate the response message simulating the response by the target user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
an interpreter configured to interpret content of a message addressed to a target user;
a storage storing information on a personal feature of the target user;
a generator configured to generate a response message simulating a response by the target user on the basis of the content of the message addressed to the target user, which is interpreted by the interpreter, and the information on the personal feature of the target user stored in the storage; and
an emotion setter configured to receive a setting instruction of an emotion based on pre-set degrees of the emotion and selecting one of the pre-set degrees of the emotion by the target user for the response message on a basis of operation of the target user,
wherein the generator is configured to dynamically directly adjust the content of the response message on a basis of the received setting instruction of the emotion of the target user to directly reflect the selected one of the pre-set degrees of the emotion.

2. The communication device of claim 1, wherein the generator is configured to generate the response message on the basis of a relationship between a sender of the message addressed to the target user and the target user.

3. The communication device of claim 1, wherein the generator is configured to generate the response message on the basis of a conversation history between a sender of the message addressed to the target user and the target user.

4. The communication device of claim 1, further comprising:
a receiver configured to receive a change instruction of the response message from the target user.

5. The communication device of claim 4, further comprising:
a person trainer configured to train the personal feature of the target user on the basis of the response message changed according to the change instruction from the target user or the setting instruction of the emotion from the target user, and store the trained personal feature in the storage.

6. The communication device of claim 1, wherein the generator is configured to generate a summary representing an implication of the target user related to the response message.

7. The communication device of claim 1, wherein the message addressed to the target user is text data or voice data.

8. The communication device of claim 1, wherein
the emotion setter is configured to receive a setting instruction of politeness based on pre-set degrees of the politeness and selecting one of the pre-set degrees of the politeness by the target user for the response message on a basis of operation of the target user, and
the generator is configured to dynamically directly adjust the content of the response message on a basis of the received setting instruction of the politeness of the target user to directly reflect the selected one of the pre-set degrees of the politeness.

9. The communication device of claim 1, wherein
the emotion setter is configured to receive a setting instruction of anger based on pre-set degrees of the anger and selecting one of the pre-set degrees of the anger by the target user for the response message on a basis of operation of the target user, and
the generator is configured to dynamically directly adjust the content of the response message on a basis of the received setting instruction of the anger of the target user to directly reflect the selected one of the pre-set degrees of the anger.

10. A communication method comprising:
interpreting content of a message addressed to a target user; and
generating a response message simulating a response by the target user on the basis of the interpreted content of the message addressed to the target user, and information on a personal feature of the target user,
wherein
the communication method further comprises:
receiving a setting instruction of an emotion based on pre-set degrees of the emotion and selecting one of the pre-set degrees of the emotion by the target user for the response message on a basis of operation of the target user; and
dynamically directly adjusting the content of the generated response message on a basis of the received setting instruction of the emotion of the target user to directly reflect the selected one of the pre-set degrees of the emotion.

11. A non-transitory computer-readable storage medium storing a communication program, which when executed by a computer, causes the computer to perform:
interpreting content of a message addressed to a target user; and
generating a response message simulating a response by the target user on the basis of the interpreted content of the message addressed to the target user, and information on a personal feature of the target user,
wherein
the communication program further causes the computer to perform:
receiving a setting instruction of an emotion based on pre-set degrees of the emotion and selecting one of the pre-set degrees of the emotion by the target user for the response message on a basis of operation of the target user; and
dynamically directly adjusting the content of the generated response message on a basis of the received setting instruction of the emotion of the target user to directly reflect the selected one of the pre-set degrees of the emotion.

* * * * *